(12) United States Patent
Hirao

(10) Patent No.: US 9,636,965 B2
(45) Date of Patent: May 2, 2017

(54) SUSPENSION SYSTEM

(71) Applicant: HITACHI AUTOMOTIVE SYSTEMS, LTD., Ibaraki (JP)

(72) Inventor: Ryusuke Hirao, Kamagaya (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 174 days.

(21) Appl. No.: 14/487,151

(22) Filed: Sep. 16, 2014

(65) Prior Publication Data

US 2015/0088379 A1 Mar. 26, 2015

(30) Foreign Application Priority Data

Sep. 20, 2013 (JP) ................................. 2013-195927

(51) Int. Cl.
| | |
|---|---|
| *B60G 17/00* | (2006.01) |
| *B60G 17/015* | (2006.01) |
| *B60G 17/016* | (2006.01) |
| *B60G 17/08* | (2006.01) |

(52) U.S. Cl.
CPC ......... *B60G 17/015* (2013.01); *B60G 17/016* (2013.01); *B60G 17/08* (2013.01); *B60G 2202/24* (2013.01); *B60G 2202/25* (2013.01); *B60G 2400/102* (2013.01); *B60G 2400/104* (2013.01); *B60G 2400/106* (2013.01); *B60G 2400/252* (2013.01); *B60G 2400/50* (2013.01); *B60G 2400/64* (2013.01); *B60G 2500/104* (2013.01); *B60G 2800/012* (2013.01); *B60G 2800/014* (2013.01); *B60G 2800/162* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,408,411 | A * | 4/1995 | Nakamura | ......... B60G 17/0182 701/48 |
| 6,427,528 | B1 * | 8/2002 | Yamakado | ........ G01M 17/0072 73/121 |
| 7,328,475 | B2 * | 2/2008 | Smith | ..................... F16L 55/28 134/8 |

(Continued)

FOREIGN PATENT DOCUMENTS

JP 2011-173503 9/2011

*Primary Examiner* — Yonel Beaulieu
(74) *Attorney, Agent, or Firm* — Wenderoth, Lind & Ponack, L.L.P.

(57) ABSTRACT

A suspension system capable of improving maneuverability and stability, the suspension system including a force generation mechanism and a controller. The controller, which controls each of shock absorbers, includes a main control calculation unit, a longitudinal force reaction force calculation unit, a lateral force reaction force calculation unit, an addition unit, and a suspension reaction force consideration unit. The controller subtracts an output from a vertical force calculation unit including the longitudinal force reaction force calculation unit, the lateral force reaction force calculation unit, and the addition unit from an output from the main control calculation unit by the suspension reaction force consideration unit, thereby succeeding in calculating a vertical force applied between a vehicle body and each wheel as a value in consistency with an actual behavior of a vehicle.

10 Claims, 7 Drawing Sheets

(56) References Cited

U.S. PATENT DOCUMENTS

| | | | | |
|---|---|---|---|---|
| 7,559,403 B2* | 7/2009 | Schmitz | ............... | B60G 3/20 |
| | | | | 180/344 |
| 7,702,442 B2* | 4/2010 | Takenaka | ........... | B60G 17/0195 |
| | | | | 701/41 |
| 9,233,692 B2* | 1/2016 | Zagorski | ................ | B62D 6/003 |
| 2005/0098964 A1* | 5/2005 | Brown | .................... | B60G 3/06 |
| | | | | 280/5.5 |
| 2007/0235972 A1* | 10/2007 | Schmitz | ................... | B60G 3/20 |
| | | | | 280/124.156 |
| 2008/0133066 A1* | 6/2008 | Takenaka | ........... | B60G 17/0195 |
| | | | | 701/1 |
| 2010/0219600 A1* | 9/2010 | Dada | ........................ | B60G 3/26 |
| | | | | 280/124.127 |
| 2011/0095502 A1* | 4/2011 | Dada | ........................ | B60G 3/26 |
| | | | | 280/124.127 |
| 2014/0358369 A1* | 12/2014 | Anderfaas | ................ | B62K 5/10 |
| | | | | 701/37 |

* cited by examiner

SUSPENSION SYSTEM

The present application claims priority under 35 U.S.C. section 119 to Japanese Patent Application No. 2013-195927 filed on Sep. 20, 2013. The entire disclosure of Japanese Patent Application No. 2013-195927 filed on Sep. 20, 2013 including specification, claims, drawings. and summary are incorporated herein by reference in its entirety.

BACKGROUND OF THE INVENTION

The present invention relates to a suspension system mounted on a vehicle such as an automobile, and preferably used for absorbing a vibration of the vehicle.

One generally known type of a suspension system mounted on a vehicle such as an automobile is a suspension system configured to include a shock absorber (a damping force adjustable shock absorber) capable of adjusting a damping force between a vehicle body and each wheel, and adjust (control) a damping force characteristic of the shock absorber with use of a control unit (a controller) (for example, refer to Japanese Patent Application Public Disclosure No. 2011-173503).

The suspension system discussed in Japanese Patent Application Public Disclosure No. 2011-173503 is configured to perform anti-dive control of changing the damping force characteristic to the hard side when the vehicle is braked, and change at least an extension-side damping force characteristic to the soft side if a wheel load decreases when performing the anti-dive control.

On the other hand, when the vehicle slows down (decelerate) or speeds up (accelerate), a longitudinal force (a force in a front-rear direction) is applied to a wheel of the vehicle according to the slow-down or the speed-up. More specifically, the wheel (a surface thereof in contact with the ground) is subject to a braking force (a force for stopping the wheel) when the vehicle slows down, and is subject to a driving force when the vehicle speeds up. In this case, the vehicle body of the vehicle is subject to a force generated according to, for example, a suspension geometry of this vehicle and applied between the vehicle body and the wheel based on the longitudinal force applied to the wheel. Further, when the vehicle turns a corner, a lateral force (a force in a left-right direction) is applied to a wheel of the vehicle according to the cornering. More specifically, when the vehicle turns a corner, a tire lateral force is applied to the wheel (the surface thereof in contact with the ground). In this case, the vehicle body of the vehicle is subject to a force (generally, referred to as a jack-up force) generated according to, for example, the suspension geometry of this vehicle and applied between the vehicle body and the wheel based on the lateral force applied to the wheel. Therefore, if the damping force characteristic of the shock absorber is adjusted (controlled) out of consideration of the longitudinal force and the lateral force applied to the wheel, and thus the forces applied to the vehicle body based on these longitudinal force and lateral force, this may leads to excessiveness or insufficiency of the damping force, resulting in, for example, a reduction in maneuverability (a driver's maneuvering feeling) and stability.

This drawback is raised in not only the shock absorber, but also an air suspension, a hydraulic stabilizer, and the like.

SUMMARY OF INVENTION

The present invention has been contrived in consideration of the above-described drawback in the conventional technique, and an object of the present invention is to provide a suspension system capable of improving the maneuverability and the stability.

To achieve the above-described object, according to an aspect of the present invention, a suspension system includes a force generation mechanism disposed between a vehicle body side and a wheel side of a vehicle and capable of adjusting a force to be generated, and a controller configured to calculate and control the force to be generated by the force generation mechanism based on vehicle body behavior information. The controller determines the force to be generated in consideration of a force containing at least a component of a force generation direction of the force generation mechanism, which is generated according to a suspension geometry and applied between the vehicle body and the wheel due to a horizontal force applied to each wheel.

DESCRIPTION OF EMBODIMENTS

Embodiments of the present invention are directed to the above-described object. More specifically, the embodiments of the present invention have been designed in consideration of the following object. In recent years, vehicles have been configured to perform various kind of speed-up and slow-down control for each wheel by deciding whether to apply a braking force or a driving force for each wheel, such as a posture control system (stability control) that controls a posture of the vehicle such as skidding, traction control of increasing a driving force, and control of applying a braking force to a wheel on one of the left side and the right side to change a travelling direction of the vehicle to maintain the vehicle within a traffic lane.

Further, suspensions are configured to optimize the posture of the vehicle body when the vehicle speeds up or slows down or when the vehicle turns a corner, with their suspension geometries such as link configurations adjusted when they are designed.

However, although each generated force varies on each wheel according to the suspension geometry when the speed-up and slow-down control is performed for each wheel, according to conventional suspension control, a controller performs control of, for example, increasing compression-side damping forces on both front left and right wheels when the vehicle is braked without making a difference between the left wheel and the right wheel during the anti-dive control, and does not take into consideration the forces generated according to the suspension geometry based on the speed-up or the slow-down for each wheel. The embodiments of the present application is directed to an object of providing a suspension system designed in consideration of such forces generated due to the suspension geometry based on the speed-up or the slow-down for each wheel, thereby further improving a control effect.

In the following description, suspension control systems according to the embodiments of the present invention will be described in detail below with reference to the accompanying drawings, based on an example in which they are employed for a four-wheeled automobile. These embodiments can be also employed for a vehicle such as a six-wheeled vehicle.

Figure 1:
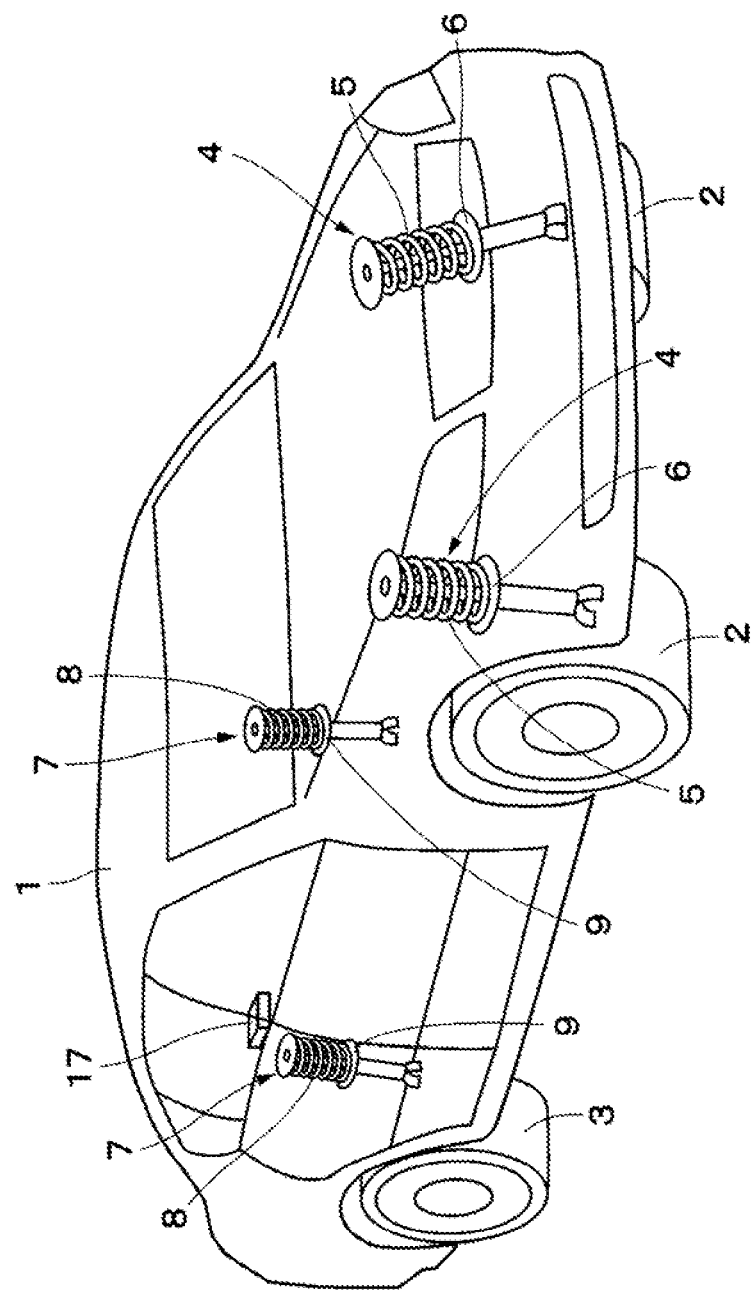
FIG. 1 illustrates an overall configuration of a four-wheeled automobile for which suspension systems according to embodiments of the present invention are employed.

FIGS. 1 to 4 illustrate a first embodiment of the present invention. Referring to FIG. 1, for example, front left and right wheels 2 and rear left and right wheels 3 (only one of the rear wheels 3 is illustrated in FIG. 1), i.e., four wheels 2 and 3 in total are disposed below a vehicle body 1, which constitutes a main structure of a vehicle.

Front wheel side suspensions 4 and 4 (hereinafter referred to as front wheel suspensions 4) are disposed between the front left and right wheels 2 and the vehicle body 1. The left and right front wheel suspensions 4 include left and right suspension springs 5 (hereinafter referred to as springs 5), left and right damping force adjustable shock absorbers (hereinafter referred to as shock absorbers 6) disposed between the front left and right wheels 2 and the vehicle body 1 in parallel with the respective springs 5, links 10 illustrated in FIGS. 3 and 4, and the like. These damping force adjustable shock absorbers 6 correspond to a force generation mechanism capable of adjusting a force to be generated, which is disposed between the vehicle body side and the wheel side of the vehicle.

Rear wheel side suspensions 7 and 7 (hereinafter referred to as rear wheel suspensions 7) are disposed between the rear left and right wheels 3 and the vehicle body 1. The left and right rear wheel suspensions 7 include left and right suspension springs 8 (hereinafter referred to as springs 8), left and right damping force adjustable shock absorbers 9 (hereinafter referred to as shock absorbers 9) disposed between the rear left and right wheels 3 and the vehicle body 1 in parallel with the respective springs 8, the links 10 illustrated in FIGS. 3 and 4, and the like. These damping force adjustable shock absorbers 9 also correspond to the force generation mechanism capable of adjusting the force to be generated, which is disposed between the vehicle body side and the wheel side of the vehicle.

Each of the shock absorbers 6 and 9 of the respective suspensions 4 and 7 includes, for example, a hydraulic shock absorber capable of adjusting a damping force, and a characteristic of a damping force to be generated (a damping force characteristic) is variably controlled by a controller 17, which will be described below. Therefore, each of the shock absorbers 6 and 9 includes an actuator (not illustrated) including a damping force adjustment valve, a solenoid, and the like to adjust the damping force characteristic from a hard characteristic (a strong damping force) to a soft characteristic (a weal damping force) continuously (or through multiple steps). Then, the damping force characteristic of each of the shock absorbers 6 and 9 is variably adjusted according to an instruction current issued from the controller 17 to the actuator.

The damping force adjustment valve can be realized by using a conventionally known structure such as a pressure control type structure that controls a pilot pressure of a damping force generation valve, a flow amount control type structure that controls a passage area, and the like. Further, each of the shock absorbers 6 and 9 may be any shock absorber capable of adjusting the damping force continuously (or through multiple steps), and may be, for example, a pneumatic damper, an electromagnetic damper, an electrorheological fluid damper, or a magnetic fluid damper. Further, the force generation mechanism may be an air suspension using an air spring, a hydraulic suspension with front, rear, left, and right hydraulic cylinders connected to one another via pipes, a stabilizer that provides a force to a movement of the left and right wheels, or the like.

Figure 2:
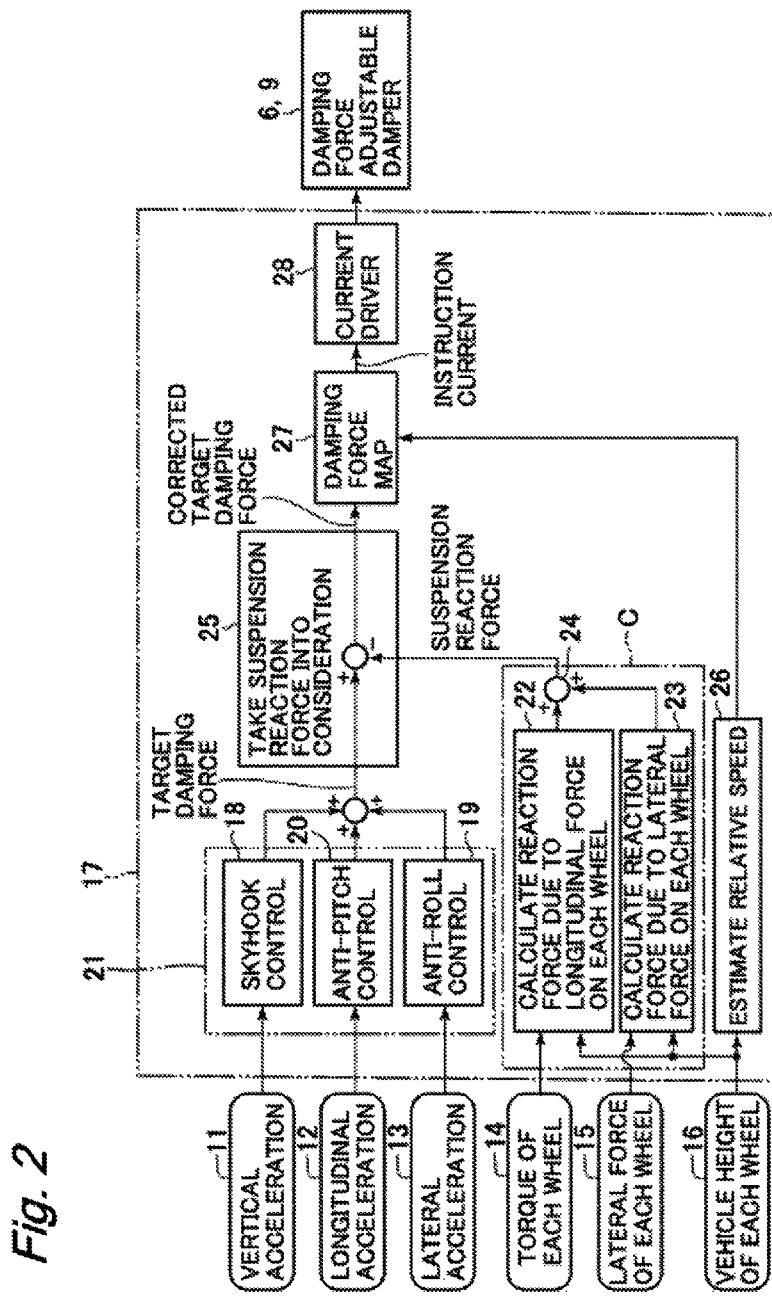
FIG. 2 is a block diagram illustrating a controller of a suspension system according to a first embodiment.

Next, various kinds of sensors 11, 12, 13, 14, 15, and 16 for detecting a motion of the vehicle will be described with reference to FIG. 2. In the present embodiment, the controller 17, which will be described below, adjusts the damping force of each of the shock absorbers 6 and 9 with use of a vertical acceleration, a longitudinal acceleration, a lateral acceleration, a torque of each wheel (a tire longitudinal force), a lateral force of each wheel (a tire lateral force), and a vehicle height of each wheel (each wheel vehicle height) among vehicle body behavior information pieces, which indicate various kinds of state amounts (motion amounts) of the vehicle. The present embodiment can be configured in such a manner that these vehicle body behavior information pieces are acquired through a direct connection between the various kinds of sensors 11, 12, 13, 14, 15, and 16, and the controller 17. Alternatively, the present embodiment may be configured in such a manner that the vehicle body behavior information pieces are acquired via a CAN (not illustrated) as a serial communication unit that performs in-vehicle multiplex communication between a large number of electronic devices mounted on the vehicle and the controller 17. Further, the controller 17 may estimate the vehicle behavior information pieces from another detected value, although the controller 17 may directly detect them. Respective control flowcharts in the present disclosure schematically illustrate control for a single wheel, but actually, a calculation is made for each of the wheels.

Three vertical acceleration sensors 11 are disposed on, for example, the vehicle body 1, which corresponds to a sprung side, and detect a vertical acceleration (an acceleration in a vertical direction, or a vertical G) at an arbitrary position on the vehicle body 1 from three acceleration signals assuming that the vehicle body is a rigid body. More specifically, the vertical acceleration sensors 11 detect the vertical acceleration while the vehicle is running, and outputs a detection signal therefrom to the controller 17, which will be described below. Alternatively, the present embodiment may be configured to estimate the vertical acceleration from a state amount of the vehicle with use of an observer or the like. Further, only a single vertical acceleration sensor 11 may be provided, or a plurality of vertical acceleration sensors 11 may be provided. Further, a vertical acceleration sensor may be disposed on an unsprung side, and the controller 17 may estimate the vertical acceleration on the sprung side therefrom.

The longitudinal acceleration sensor 12 is disposed on, for example, the vehicle body 1, which corresponds to the sprung side, and detects a longitudinal acceleration of the vehicle body 1 (an acceleration in a front-rear direction or a longitudinal G). The longitudinal acceleration sensor 12 detects the longitudinal acceleration generated according to speed-up or slow-down while the vehicle is running, and outputs a detection signal therefrom to the controller 17, which will be described below. The longitudinal acceleration may be calculated (estimated) with use of a longitudinal force (a driving force or a braking force) on each of the wheels 2 and 3, which is acquired by dividing a torque of each of the wheels 2 and 3 (each wheel torque) detected by, for example, a torque sensor 14 that will be described below by a turning radius of each of the wheels 2 and 3.

The lateral acceleration sensor (a left-right acceleration sensor) 13 is disposed on, for example, the vehicle body 1, which corresponds to the sprung side, and detects a lateral acceleration of the vehicle body 1 (an acceleration in a left-right direction, a side acceleration, or a lateral G). The lateral acceleration sensor 13 detects the lateral acceleration generated according to cornering while the vehicle is running, and outputs a detection signal therefrom to the controller 17, which will be described below. The lateral acceleration may be calculated (estimated) with use of, for example, a steering angle (an angle of a steering wheel) of the vehicle and a speed of the vehicle (a vehicle speed). In this case, a steering angle sensor that detects the steering angle, and a vehicle speed sensor that detects the vehicle speed (for example, a rotational sensor that detects a rotation of a rotational axis of a transmission, or a rotational sensor that detects a rotation of the wheel 2 or 3) can be provided on the vehicle (the vehicle body 1).

The torque sensors 14 are disposed on, for example, the wheels 2 and 3, which correspond to the unsprung side, respectively. More specifically, the torque sensors 14 are disposed on, for example, hub units (bearing units) that rotatably support the respective wheels 2 and 3, respectively, and detect torques of the respective wheels 2 and 3. The respective torque sensors 14 individually detect the torques applied to the respective wheels 2 and 3 while the vehicle is running, and output detection signals therefrom to the controller 17, which will be described below.

The torque of each of the wheels 2 and 3 may be calculated (estimated) from, for example, a value (a brake hydraulic pressure) detected by a brake hydraulic sensor disposed for each of the wheels 2 and 3 to detect a hydraulic pressure in a brake apparatus, or a value (a master cylinder hydraulic pressure) detected by a master cylinder hydraulic sensor that detects a hydraulic pressure in a master cylinder, instead of detecting it with use of the torque sensor 14. In this case, generally, a relationship between the brake hydraulic pressure and the longitudinal force (the torque) can be considered to be a proportional relationship on the front side and the rear side independently of each other. Further, if the vehicle is configured in such a manner that a braking force is applied with use of an electric brake or regeneration of an in-wheel motor, the torque of each of the wheels 2 and 3 may be calculated (estimated) from a brake instruction (a brake torque instruction) or a current to this electric brake or this in-wheel motor. Further alternatively, the torque of each of the wheels 2 and 3 may be calculated (estimated) from a torque of an engine (an engine torque). In this case, the torque is calculated in consideration of a gear ratio, efficiency, and the like of the transmission.

The tire lateral force (the wheel lateral force) is detected with use of a tire force sensor 15 mounted on the tire. Alternatively, a vehicle behavior may be estimated from sensor information of the vehicle, and then the tire lateral force (the wheel lateral force) may be calculated (estimated) with use of an online tire model. Alternatively, a vehicle model may be constructed, and then the tire lateral force may be calculated (estimated) by inputting a signal such as a steering angle and a vehicle speed into this vehicle model. Further alternatively, the tire lateral force may be simply calculated with use of a value of the lateral acceleration sensor 13, because the tire lateral force is a value generally proportional to the lateral acceleration.

The vehicle height sensors 16 detect a height of the vehicle body 1, and are disposed on, for example, the vehicle body 1, which corresponds to the sprung side, so as to correspond to the respective wheels 2 and 3. More specifically, the respective vehicle height sensors 16 detect relative positions (height positions) of the vehicle body 1 relative to the respective wheels 2 and 3, and output detection signals therefrom to the controller 17, which will be described below.

Next, the controller 17 that controls the shock absorbers 6 and 9 will be described.

Reference numeral 17 denotes a controller as a control unit including a microcomputer or the like. The controller 17 controls each of the shock absorbers 6 and 9 (adjust the damping force) based on a vehicle motion (the vehicle behavior information) detected by the various kinds of sensors 11, 12, 13, 14, 15, 16, and the like. In other words, the controller 17 calculates and controls the damping force of each of the shock absorbers 6 and 9 (a force to be generated) based on the vehicle body behavior information. For achieving this function, the vertical acceleration sensors 11, the longitudinal acceleration sensor 12, the lateral acceleration sensor 13, the torque sensors 14, the tire force sensors 15, and the vehicle height sensors 16 are connected to an input side of the controller 17 directly, or via the CAN or the like. An output side of the controller 17 is connected to the actuator and the like of each of the shock absorbers 6 and 9. The controller 17 reads in the vertical acceleration, the longitudinal acceleration, the lateral acceleration, the torque of each wheel, the tire lateral force of each wheel, and the height of each wheel from the various kinds of sensors 11, 12, 13, 14, 15, 16, and the like. Four torque sensors 14 in total, four tire force sensors 15 in total, and four vehicle height sensors 16 in total are disposed on the wheels 2 and 3, respectively.

The controller 17 includes a storage unit (not illustrated) realized by a ROM, a RAM, a nonvolatile memory, or the like. The storage unit stores a control law for controlling the damping force as will be described below, maps (a gain map and a damping force map), a calculation equation, various kinds of parameters, a threshold value, a processing program, and the like.

The controller 17 adjusts the damping force of each of the shock absorbers 6 and 9 based on a vertical vibration of the vehicle, and a horizontal force applied to the wheel 2 or 3 due to slow-down, speed-up, and cornering. The horizontal force includes a longitudinal force and a lateral force. The longitudinal force is also referred to as a front-rear force. The lateral force is also referred to as a left-right force.

The controller 17 calculates a vertical force (a suspension reaction force) applied to the vehicle body 1 from the longitudinal force and the lateral force (a braking force, a driving force, and a left-right force) applied to the wheel 2 or 3 due to slow-down, speed-up, or cornering of the vehicle, and adjust the damping force of each of the shock absorbers 6 and 9.

The controller 17 includes a main control calculation unit 21, a longitudinal force reaction force calculation unit 22, a lateral force reaction force calculation unit 23, an addition unit 24, a suspension reaction force consideration unit (a geometry force consideration unit) 25, a relative speed estimation unit 26, a damping force map calculation unit 27, and a current driver 28. The main control calculation unit 21 includes a Skyhook control unit 18 as vehicle body vibration control, an anti-roll control unit 19, and an anti-dive and squat control unit (an anti-pitch control unit) 20. The vehicle body vibration control controls a vibration of the vehicle body (ride comfort control), and may be control based on another control theory than Skyhook. Further, the anti-roll control and the anti-pitch (dive and squat) control are also referred to as posture control because they control a running posture of the vehicle, while the vehicle body vibration control is referred to as the ride comfort control.

The longitudinal force reaction force calculation unit 22, the lateral force reaction force calculation unit 23, the addition unit 24, and the suspension reaction force consideration unit 25 constitute a unit for taking into consideration a force generated according to a suspension geometry (referred to as a geometry force in the present disclosure) due to the longitudinal force and the lateral force generated on the tire (the horizontal force applied to the wheel 2 or 3), i.e., a unit for taking into consideration of the vertical force (a geometry force consideration unit). More specifically, the longitudinal force reaction force calculation unit 22, the lateral force reaction force calculation unit 23, and the addition unit 24 calculate the vertical force (the geometry force) applied between the vehicle body 1 and the wheel 2 or 3 based on the vehicle behavior information (the torque of each wheel, the lateral force of each wheel, and the vehicle height of each wheel among the vehicle behavior information pieces). In other words, the longitudinal force reaction force calculation unit 22, the lateral force reaction force calculation unit 23, and the addition unit 24 constitute a vertical force calculation unit C as the geometry force calculation unit. The vertical force means not only a force perpendicular to the ground, but also a force in a direction in which the force generation mechanism, i.e., each of the shock absorbers 6 or 9 operates (a force generation direction). In other words, the direction in which the force is generated varies according to an angle at and a direction in which each of the shock absorbers 6 or 9 is mounted, a link configuration of the suspension, and even the vehicle height. The geometry force is determined based on the configuration of the link 10 of the suspension or the like, and is a force pushing up or pulling down the vehicle body according to speed-up, slow-down, and a lateral acceleration. In some cases, the geometry force may not be changed so much according to the vehicle height, or may be changed linearly or non-linearly. If the geometry force is changed largely according to the vehicle height, the control should be performed in consideration of the vehicle height. If the geometry force is hardly changed according to the vehicle height, the control does not have to be performed in consideration of the vehicle height.

Figure 3:
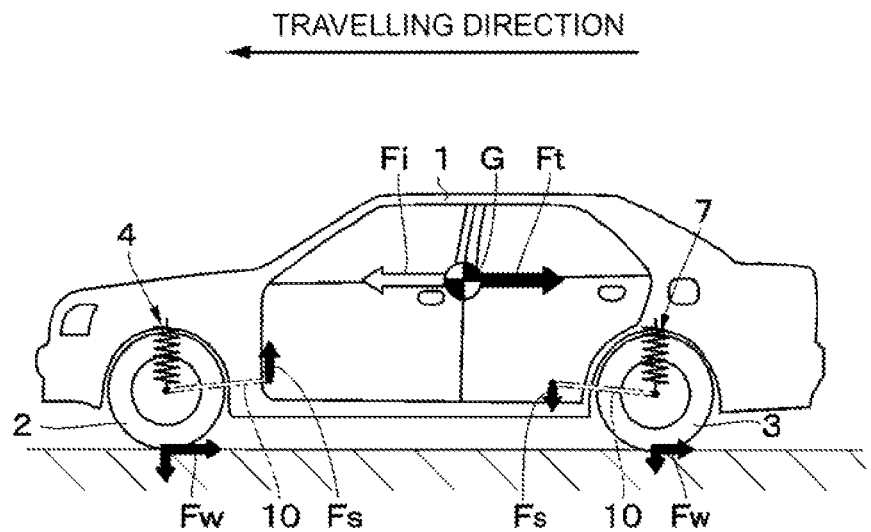
FIG. 3 is a side view of the four-wheeled automobile that illustrates a relationship among braking forces, an inertial force, and suspension reaction forces when the vehicle is braked.

For example, as illustrated in FIG. 3, when braking forces (brake forces) Fw are provided to the respective wheels 2 and 3 while the vehicle is running, an inertial force Fi equal to a total braking force Ft, which is a sum of these braking forces Fw provided to the respective wheels 2 and 3, is applied (added) to a center of gravity G of the vehicle body 1 toward the front side of the vehicle body. The longitudinal acceleration sensor 12, the lateral acceleration sensor 13, and the vertical acceleration sensors 11 detect changes in the accelerations based on the inertial force Fi, and the main control calculation unit 21 calculates changes in vertical loads on the respective wheels 2 and 3 from these changes in the accelerations.

The longitudinal force reaction force calculation unit 22 and the lateral force reaction force calculation force 23 constitute the vertical force calculation unit (the geometry force calculation unit) C together with the addition unit 24. In this case, the longitudinal force reaction force calculation unit 22 calculates the longitudinal forces (the front-rear forces or the longitudinal tire forces) applied to the wheels 2 and 3 from the torques of the respective wheels 2 and 3 output from the torque sensors 14 with use of the turning radii of the wheels 2 and 3. More specifically, the longitudinal force reaction force calculation unit 22 calculates the longitudinal forces (the braking forces or the driving forces) applied to the wheels 2 and 3 due to slow-down or speed-up of the vehicle by dividing the torques of the respective wheels 2 and 3 by the radii of the respective wheels 2 and 3.

Further, the longitudinal force reaction force calculation unit 22 calculates the vertical forces applied to the vehicle body 1 based on the longitudinal forces applied to the wheels 2 and 3 due to slow-down or speed-up of the vehicle, and the vehicle heights. In this case, the longitudinal force reaction force calculation unit 22 calculates the vertical forces applied to the vehicle body 1 while also taking into consideration changes therein due to the suspension geometry between the vehicle body 1 and the wheels 2 and 3, and the vehicle heights (in other words, based on a relationship among the suspension geometry, the longitudinal forces applied to the wheels 2 and 3, and the vehicle heights). The vertical force is changed due to the vehicle height because of a change in an angle defined between an axis connecting an origin of the tire force and an instantaneous center of rotation of the suspension link and an axis of the vehicle body at that time in the longitudinal direction due to the vehicle height. Therefore, this relationship may be stored as a map between the longitudinal force and the vehicle height, and then the vertical force may be calculated therefrom. Alternatively, the calculation may be simplified assuming that the vehicle height is constant.

For example, as illustrated in FIG. 3, when the braking forces (brake forces) Fw are provided to the respective wheels 2 and 3 while the vehicle is running, torques are applied to the wheels 2 and 3 according to these braking forces Fw, and these torques are detected by the torque sensors 14. The longitudinal force reaction force calculation unit 22 calculates the longitudinal forces, i.e., the braking force Fw applied to the respective wheels 2 and 3 by dividing the detected torques by the radii of the wheels 2 and 3. Then, the longitudinal force reaction force calculation unit 22 calculates the vertical forces applied to the vehicle body 1, i.e., suspension reaction forces Fs from the braking forces Fw and the vehicle heights of the respective wheels 2 and 3 in consideration of the suspension geometry of this vehicle.

As illustrated in FIG. 3, these suspension reaction forces (the geometry forces) Fs are applied to the vehicle body 1 via the suspension links 10. In this case, the suspension reaction forces Fs are changed according to the setting of the suspension geometry. For example, if an anti-dive geometry or an anti-lift geometry is set, the suspension reaction forces Fs in an upward direction, which serve as anti-dive forces, are applied to the front wheels 2, and the suspension reaction forces Fs in a downward direction, which serve as anti-lift forces, are applied to the rear wheels 3. The longitudinal force reaction force calculation unit 22 calculates the vertical forces applied to the vehicle body 1, i.e., the suspension reaction forces Fs from the longitudinal forces and the vehicle heights based on the relationship between the suspension geometry and the longitudinal forces (Fw) applied to the wheels 2 and 3.

Figure 4:
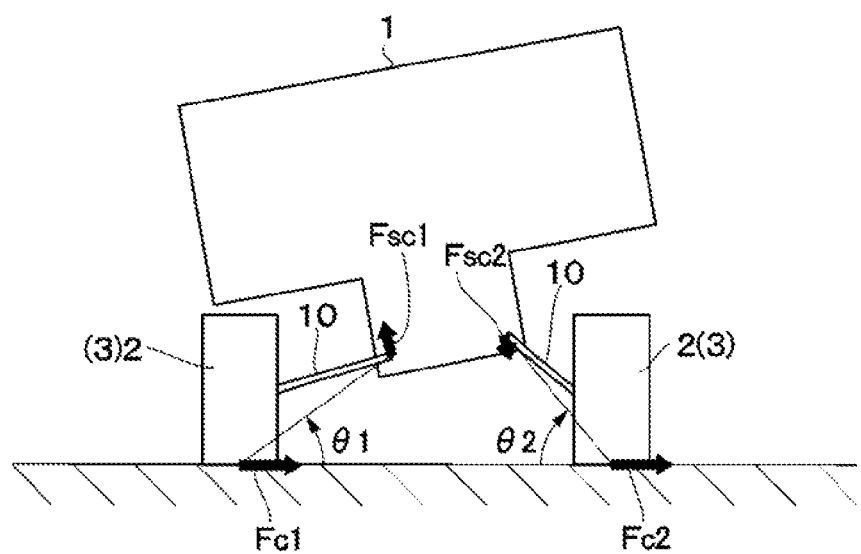
FIG. 4 is a front view of the four-wheeled automobile that illustrates a relationship between lateral forces and suspension reaction forces when the vehicle turns a corner.

For example, as illustrated in FIG. 4, when the lateral forces Fc are provided to the respective wheels 2 and 3 due to cornering while the vehicle is running, these lateral forces Fc are applied to the wheels 2 and 3, and are detected by the tier force sensors 15. In FIG. 4, "1" is added at the ends of the state amounts such as the lateral forces Fc, suspension reaction forces Fsc, and angles θ that indicate one of the left side and the right side while "2" is added at the ends of these state amounts that indicate the other of the left side and the right side. The lateral force reaction force calculation unit 23 calculates the vertical forces applied to the vehicle body 1, i.e., the suspension reaction forces Fsc from the lateral forces Fc and the vehicle heights of the respective wheels 2 and 3 in consideration of the suspension geometry of this vehicle.

As illustrated in FIG. 4, these suspension reaction forces Fsc are applied to the vehicle body 1 via the suspension links 10. In this case, the suspension reaction forces Fsc are changed according to the setting of the suspension geometry. For example, if a jack-down characteristic is set, the suspension reaction forces Fsc in the upward direction and the suspension reaction forces Fsc in the downward direction are applied to wheels on an outer side in cornering and wheels on an inner side in cornering, respectively. For example, the suspension reaction forces Fsc can be expressed as "Fsc=Fc×tan θ". The vertical force is changed according to the vehicle height, because of a change in the angle defined between the axis connecting the origin of the tire force and the instantaneous center of rotation of the suspension link and the axis of the vehicle body 1 at that time in the longitudinal direction due to the vehicle height. Therefore, this relationship may be stored as a map between the lateral force and the vehicle height, and then the vertical force may be calculated therefrom. Alternatively, the calculation may be simplified assuming that the vehicle height is constant. The lateral force reaction force calculation unit 23 calculates the vertical forces applied to the vehicle body 1, i.e., the suspension reaction forces Fsc from the lateral forces and the vehicle heights based on the relationship between the suspension geometry and the lateral forces (Fc) applied to the wheels 2 and 3. The example illustrated in FIG. 4 indicates independent suspensions, but the suspension reaction forces Fsc can be calculated even for rigid axles based on a similar idea.

The suspension reaction force consideration unit (the geometry force consideration unit) 25 constitutes the geometry force consideration unit together with the longitudinal force reaction force calculation unit 22, the lateral force reaction force calculation unit 23, and the addition unit 24. In this case, the geometry force consideration unit 25 subtracts the vertical force (the suspension reaction force Fs on each of the wheels 2 and 3) calculated by the longitudinal force reaction force calculation unit 22 for each wheel and the lateral force reaction force calculation unit 23 for each wheel, and added by the addition unit 24, from a target damping force calculated by adding target damping forces respectively output from the Skyhook control unit 18, the anti-roll control unit 19, and the anti-dive and squat control unit (the anti-pitch control unit) 20. As a result, the geometry force consideration unit 25 can acquire the target damping force in consideration of a force containing at least a component of the force generation direction of the force generation mechanism, which is generated according to the geometry and applied between the vehicle body 1 and each wheel.

The geometry force consideration unit 25 corrects the target damping force with use of the vertical force calculated by the reaction force calculation units 22 and 23, by subtracting the vertical force (the suspension reaction force Fs on each of the wheels 2 and 3) calculated by the longitudinal force reaction force calculation unit 22 and the lateral force reaction force calculation unit 23, and added by the addition unit 24, from the target damping force calculated by adding the target damping forces respectively output from the Skyhook control unit 18, the anti-roll control unit 19, and the anti-dive and squat control unit (the anti-pitch control unit) 20.

As a result, the vertical force applied between each of the wheels 2 and 3 and the vehicle body 1 when the longitudinal force and the lateral force (the braking force, the driving force, and the left-right force) is applied to each of the wheels 2 and 3 can be calculated as a value according to the suspension geometry of this vehicle, i.e., a value consistent with the actual behavior of the vehicle.

The relative speed estimation unit 26 calculates a vertical relative speed between the vehicle body 1 and each of the wheels 2 and 3 based on the relative position (the height position) of the vehicle body 1 relative to each of the wheels 2 and 3, which is detected by the vehicle height sensor 16. More specifically, the relative speed estimation unit 26 calculates the vertical relative speed between the vehicle body 1 and each of the wheels 2 and 3 by differentiating a signal (the height position) detected by the vehicle height sensor 16.

The damping force map calculation unit 27 calculates a current instruction value (an instruction current) to be output to the current driver 28 from the target damping force corrected with use of the suspension reaction force Fs (of each wheel) (a corrected target damping force) and the vertical relative speed (of each wheel) calculated by the relative speed estimation unit 26. The damping force map calculation unit 27 includes, for example, a damping force map that indicates a relationship among the target damping force, the vertical relative speed, and the current instruction value. Then, the damping force map calculation unit 27 outputs the current instruction value from the corrected target damping force and relative speed calculated by the relative speed estimation unit 26 with use of the damping force map.

The current driver 28 controls a current value corresponding to the target damping force to be output to the actuator of each of the shock absorbers 6 and 9 based on the current instruction value output from the damping force map calculation unit 27. Then, each of the shock absorbers 6 and 9 variably controls the damping force characteristic between the hard side and the soft side according to the current value supplied to the actuator, continuously or through multiple steps.

The suspension system according to the first embodiment is configured in the above-described manner. Next, an operation thereof will be described.

When the longitudinal force and the lateral force (the driving force, the braking force Fw, and the lateral force Fc; refer to FIGS. 3 and 4) is applied to the wheel 2 or 3 due to slow-down, speed-up, or cornering while the vehicle is running, the torque based on these longitudinal force and lateral force is detected by the torque sensor 14, and a detected value therefrom (the torque) is output to the reaction force calculation unit 22. The longitudinal force reaction force calculation unit 22 calculates the longitudinal force applied to the wheel 2 or 3 from the torque, and calculates the suspension reaction force Fs, which is the vertical force applied to the vehicle body 1, based on this longitudinal force in consideration of the suspension geometry (and the vehicle height at that time).

Further, the lateral force reaction force calculation unit 23 calculates the lateral force generated on the tire, and calculates the suspension reaction force Fsc, which is the vertical force applied to the vehicle body 1, based on this lateral force in consideration of the suspension geometry (and the vehicle height at that time).

On the other hand, when the inertial force Fi is applied to the vehicle body 1 due to slow-down, speed-up, or cornering, changes in the accelerations based on this inertial force Fi are detected by the longitudinal acceleration sensor 12 and the lateral acceleration sensor 13, and detected values therefrom (the longitudinal acceleration and the lateral acceleration) are respectively output to the anti-dive and squat control unit (anti-pitch control unit) 20 and the anti-roll control unit 19. The anti-dive and squat control unit 20 and the anti-roll control unit 19 calculate the target damping forces for each wheel so as to constrain, prevent or reduce a pitch and a roll generated by the longitudinal acceleration and the lateral acceleration.

Further, the Skyhook control unit 18 calculates the target damping force based on the detection from the vertical acceleration sensors 11 according to the Skyhook control so as to constrain, prevent or reduce a vertical vibration. The target damping forces of the respective anti-dive and squat control unit 20, anti-roll control unit 19, and Skyhook control 18 are added, and the sum is set as the target damping force for each wheel.

The geometry force consideration unit 25 subtracts the suspension reaction force Fs calculated by the vertical force calculation unit (the geometry force calculation unit) C from the target damping force for each wheel, which is calculated and added by the main control calculation unit 21 constituted by the anti-dive and squat control unit 20, the anti-roll control unit 19, and the Skyhook control 18. Then, the corrected target damping force is acquired as the value determined in consideration of the suspension reaction forces Fs.

Then, the damping force map calculation unit 27 calculates the current instruction value corresponding to the damping force to be generated by each of the shock absorbers 6 and 9 based on the corrected target damping force for each wheel, which is calculated by the geometry force consideration unit 25, and the relative speed calculated by differentiating the height position detected by the vehicle height sensor 16 by the relative speed estimation unit 26, with use of the predetermined damping force map. The current instruction value calculated by the damping force map calculation unit 27 is output to each of the shock absorbers 6 and 9 via the current driver 28.

When the vehicle slows down, speeds up, or turns a corner, the vertical geometry force (the suspension reaction force Fs) according to the suspension geometry of the vehicle is applied to the vehicle body 1 based on the longitudinal force and the lateral force (the driving force, the braking force Fw, and the lateral force Fc) applied to the wheel 2 or 3. Therefore, if the damping force characteristic of each of the shock absorbers 6 and 9 is adjusted (controlled) out of consideration of the vertical force (the geometry force) applied to the vehicle body 1 based on the longitudinal force and the lateral force (the horizontal force) applied to the wheel 2 or 3, this may lead to excessiveness or insufficiency of the damping force, resulting in, for example, a reduction in maneuverability (a driver's maneuvering feeling) and stability.

For solving this drawback, according to the first embodiment, the controller 17 is configured to adjust the damping force of each of the shock absorbers 6 and 9 in light (consideration) of the vertical force (the geometry force) applied to the vehicle body 1 based on the longitudinal force and the lateral force (the horizontal force) applied to the wheel 2 or 3.

More specifically, the controller 17 calculates the vertical force (the suspension reaction force Fs) applied to the vehicle body 1 from the longitudinal force (the driving force and the braking force Fw) applied to the wheel 2 or 3 by the longitudinal force reaction force calculation unit 22.

Further, the controller 17 calculates the vertical force (the suspension reaction force Fsc) applied to the vehicle body 1 from the lateral force (the lateral force Fc) applied to the wheel 2 or 3 by the lateral force reaction force calculation unit 23.

Then, the controller 17 adds the vertical force (the suspension reaction force Fs) calculated by the reaction force calculation unit 22 and the vertical force (the suspension reaction force Fsc) calculated by the reaction force calculation unit 23 by the addition unit 24, and uses the vertical force added by the addition unit 24 for the calculation (the correction) of the target damping force.

In this case, the reaction force calculation units 22 and 23 are configured to calculate the vertical force (the suspension reaction forces Fs) applied to the vehicle body 1 in consideration of the suspension geometry, i.e., based on the relationships between the suspension geometry, and the longitudinal force and the lateral force (and the vehicle height) applied to the wheel 2 or 3. Therefore, the vertical force applied between the vehicle body 1 and each of the wheels 2 and 3 can be calculated as the value consistent with the vertical force actually applied between the vehicle body 1 and the wheel 2 or 3. In other words, the vertical force can be calculated as the value according to the suspension geometry of the vehicle on which the shock absorbers 6 and 9 are mounted (the value consistent with the actual behavior of the vehicle).

According to the first embodiment, when the longitudinal force and the lateral force are applied to the wheel 2 or 3 due to slow-down, speed-up, or cornering of the vehicle, the controller 17 is configured to calculate the vertical force (the suspension reaction force Fs) based on the relationships between these longitudinal force and lateral force (and the vehicle height), and the suspension geometry by the reaction force calculation units 22 and 23, and use the calculated value therefrom as the correction value for the adjustment of the damping force. As a result, the first embodiment can constrain, prevent or reduce excessiveness or insufficiency of the damping force of each of the shock absorbers 6 and 9, thereby improving the maneuverability and the stability.

For example, as illustrated in FIG. 3, when the vehicle slows down, the inertial force Fi is applied toward the front side of the vehicle body 1 in such a manner that the front wheels 2 of the vehicle body 1 are lowered, and the rear wheels 3 of the vehicle body 1 are lifted. At this time, the upward forces (the suspension reaction forces Fs serving as the anti-dive forces) are applied to the front wheels 2 according to the suspension geometry (the anti-dive geometry) of this vehicle, and the downward forces (the suspension reaction forces Fs serving as the anti-lift forces) are applied to the rear wheels 3 according to the suspension geometry (the anti-lift geometry) of this vehicle.

This vertical force (the suspension reaction force Fs) is changed according to the setting of the suspension geometry of the vehicle. However, according to the first embodiment, the controller 17 is configured to subtract the vertical force (the suspension reaction force Fs) calculated by the reaction force calculation units 22 and 23 by the suspension reaction force consideration unit (the geometry force consideration unit) 25, thereby succeeding in absorbing the change in the vertical force due to the suspension geometry. As a result, the first embodiment can constrain, prevent or reduce excessiveness or insufficiency of the damping force control, and set an appropriate control amount of the damping force.

Further, when the vehicle speeds up, the inertial force is also applied to the vehicle body 1, and the vertical force (the suspension reaction force) is applied to the driving wheel based on the driving force. Also in this case, the controller 17 subtracts the vertical force (the suspension reaction force) calculated by the reaction force calculation units 22 and 23 from the target damping force by the suspension reaction force consideration unit (the geometry force consideration unit) 25, thereby succeeding in absorbing the influence from this vertical force (the suspension reaction force), i.e., the change in the vertical force (the suspension reaction force serving as the anti-squat force) due to the suspension geometry (the anti-squat geometry). As a result, the controller 17 can set the appropriate control amount of the damping force also in terms of that.

On the other hand, if the damping force is adjusted out of consideration the reaction force on each wheel, same control forces are set for the shock absorbers 6 on the front wheels 2 and the shock absorbers 9 on the rear wheels 3 regardless of the driving method, assuming that, for example, a position G of the center of gravity is located at a center (a middle position) between the front wheels 2 and the rear wheels 3, and control gains are also the same for the front side and the rear side. However, for example, if the vehicle is configured based on the rear wheel driving method, driving forces are generated only on the rear wheels 3 so that forces for canceling the inertial force, i.e., upward reaction forces (the anti-squat forces) are generated on the rear wheels 3. As a result, the front wheels 2 have larger vertical behaviors compared to the rear wheels 3 (front wheel behaviors > rear wheel behaviors). In this case, the control amounts of the shock absorbers 6 and 9 should be also set in such a manner that the control amounts for the front wheels 2 become larger than the control amounts for the rear wheels 3 according to a relationship between the degrees of the behaviors of the front wheels 2 and the rear wheels 3 (front-wheel side control amounts > rear-wheel side control amounts).

For meeting this requirement, according to the first embodiment, the controller 17 takes into consideration the reaction forces (the suspension reaction forces) based on the longitudinal forces (the tire longitudinal forces) applied to the driving wheels (the rear wheels 3) by the reaction force calculation units 22 and 23, the addition unit 24, and the suspension reaction force consideration unit (the geometry force consideration unit) 25, and automatically estimates smaller target damping forces therefor. As a result, the control amounts of the shock absorbers 6 and 9 are also set in such a manner that the control amounts for the front wheels 2 become larger than the control amounts for the rear wheels 3. Therefore, the first embodiment can systematically perform the control according to the behavior of the vehicle.

Further, the vehicle behaves in the following manner when the torques are independently controlled for the respective wheels 2 and 3 according to, for example, actuation of an electronic stability control system (ESC) that applies a braking force to a predetermined wheel according to the posture of the vehicle, or actuation of a traffic lane departure prevention system that applies a braking force to a predetermine wheel according to a relationship between the vehicle and a traffic lane. When the electronic stability control system is actuated, a braking force (a force for stopping the wheel) is generated according to oversteer or understeer of the vehicle. For example, suppose that a braking force is applied to only one of the front wheels 2, for example, only the front right wheel 2. In this case, a braking force (a longitudinal force) is applied to the front right wheel 2, and a vertical force according to the suspension geometry, i.e., the vertical suspension reaction force is generated on the front right wheel 2 based on this braking force.

At this time, an inertial force is applied to the vehicle body 1 due to slow-down (by the braking force) in such a manner that the front wheels 2 are lowered and the rear wheels 3 are lifted (the front side dives). In this case, an external force decreases on the front right wheel 2, which is a braked wheel, and this front right wheel 2 has a small behavior. In other words, the wheel 2 or 3 subject to the braking force due to the actuation of the electronic stability control system has a reduced vertical behavior while the wheel 2 or 3 unaffected by the braking force has a larger vertical behavior compared to the wheel 2 or 3 subject to the braking force.

For handling this case, according to the first embodiment, the controller 17 automatically estimates that the braked wheel (the front right wheel 2) has a small behavior in consideration of the vertical suspension reaction force based on the braking force applied to the braked wheel (the front right wheel 2) by the reaction force calculation units 22 and 23, the addition unit 24, and the suspension reaction force consideration unit (the geometry force consideration unit) 25. Therefore, the control amounts of the shock absorbers 6 and 9 are set in such a manner that the control amount for the front right wheel 2 decreases while the control amounts for the other wheels (for example, the front left wheel 2 and the rear right wheel 3) increase, thereby realizing adjustment of the damping forces according to the actual behavior of the vehicle. As a result, the first embodiment can constrain, prevent or reduce excessiveness or insufficiency of the damping force of each of the shock absorbers 6 and 9, thereby improving the maneuverability and the stability.

Further, the configuration according to the first embodiment can be also employed for, for example, a configuration that performs the anti-dive control of changing the damping force characteristic to the hard side when the vehicle is braked. In this case, when the vehicle is braked, the vertical force applied to the vehicle body 1 based on the longitudinal force (the braking force) applied to the wheel 2 or 3 is taken into consideration by the reaction force calculation units 22 and 23, the addition unit 24, and the suspension reaction force consideration (the geometry force consideration unit) 25. Therefore, when the damping force is set to the hard side due to the anti-dive control, the damping force is corrected based on the vertical force (the suspension reaction force) applied according to the relationship between the longitudinal force (the braking force) at that time (and the vehicle height), and the suspension geometry. In other words, the damping force can be corrected to the soft side according to the suspension reaction force based on the longitudinal force at that time. As a result, the first embodiment can control each of the shock absorbers 6 and 9 (adjust the damping force) in consistency with the behavior of the vehicle also in terms of that, thereby further improving the maneuverability and the stability.

The longitudinal force and the lateral force are generated due to speed-up, slow-down, or cornering, whereby a correction may be made to a value calculated by adding a correction with use of the longitudinal force and the lateral force to each target damping force from the anti-dive and squat control and the anti-dive control that control a behavior generated due to speed-up, slow-down, or cornering, and the instruction current value for the anti-dive and squat control and the anti-dive control may be calculated from this corrected target damping force and the relative speed with use of the damping force map. In this case, it is preferable that the controller 17 is configured to calculate the instruction current value from the target damping force of the Skyhook control, and perform so-called select-high of selecting a larger value between the instruction current value from the Skyhook control and the instruction current value from the anti-dive and squat control and the anti-dive control.

Further, according to the first embodiment, the controller 17 takes into consideration the longitudinal force and the lateral force applied to the wheel due to speed-up, slow-down, or cornering. However, the controller 17 may calculate the force generated according to the suspension geometry and applied between the vehicle body and the wheel with use of only one of the longitudinal force and the lateral force.

Figure 5:
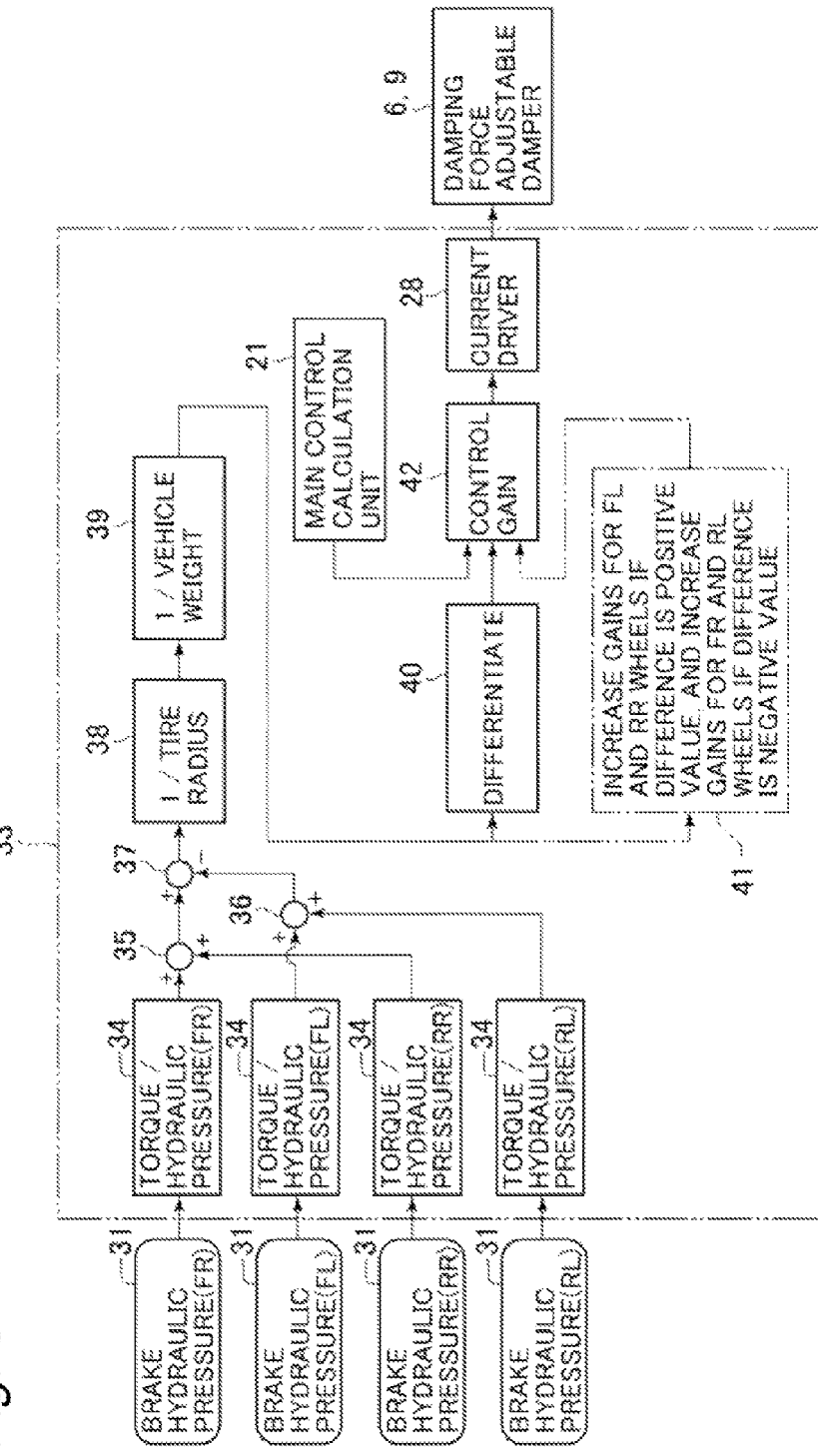
FIG. 5 is a block diagram illustrating a controller of a suspension system according to a second embodiment.
Figure 6:
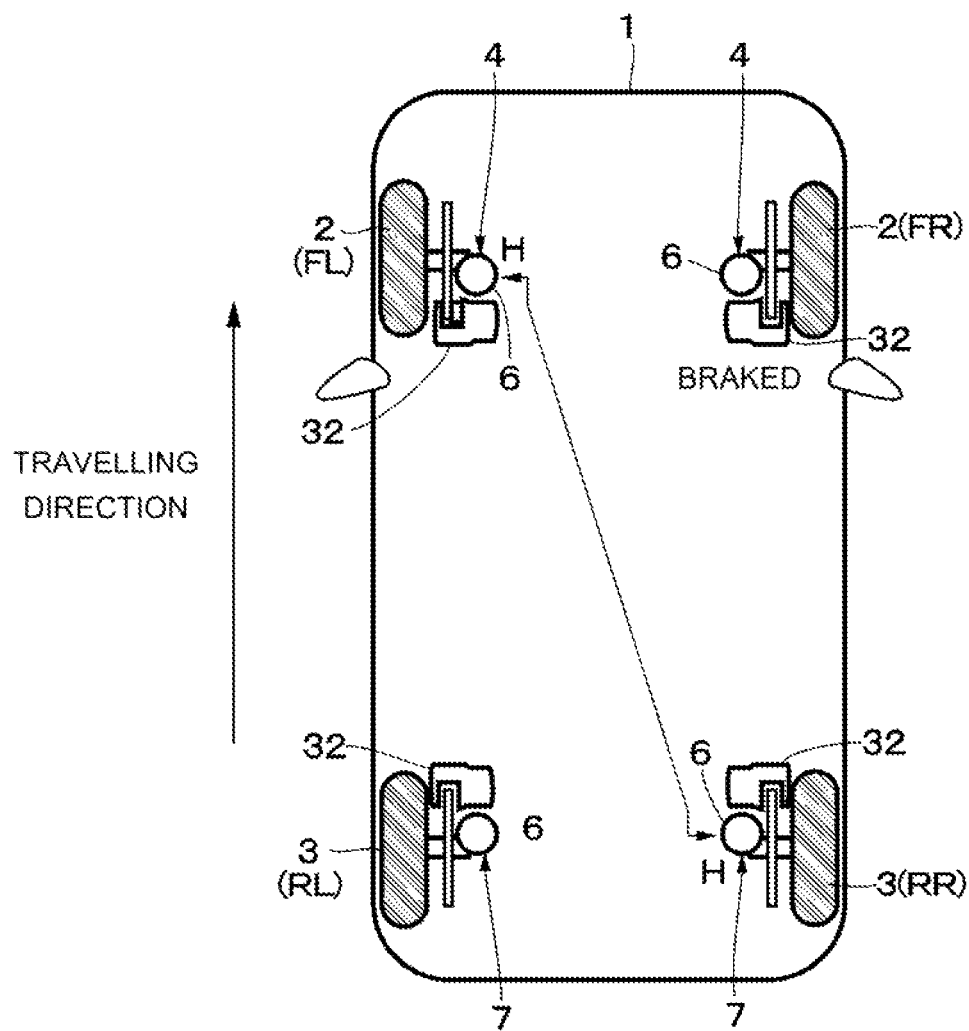
FIG. 6 is a schematic plan view of the four-wheeled automobile that illustrates a relationship between a wheel subject to a braking force and shock absorbers with their damping forces adjusted (corrected) into a hard direction.
Figure 7:
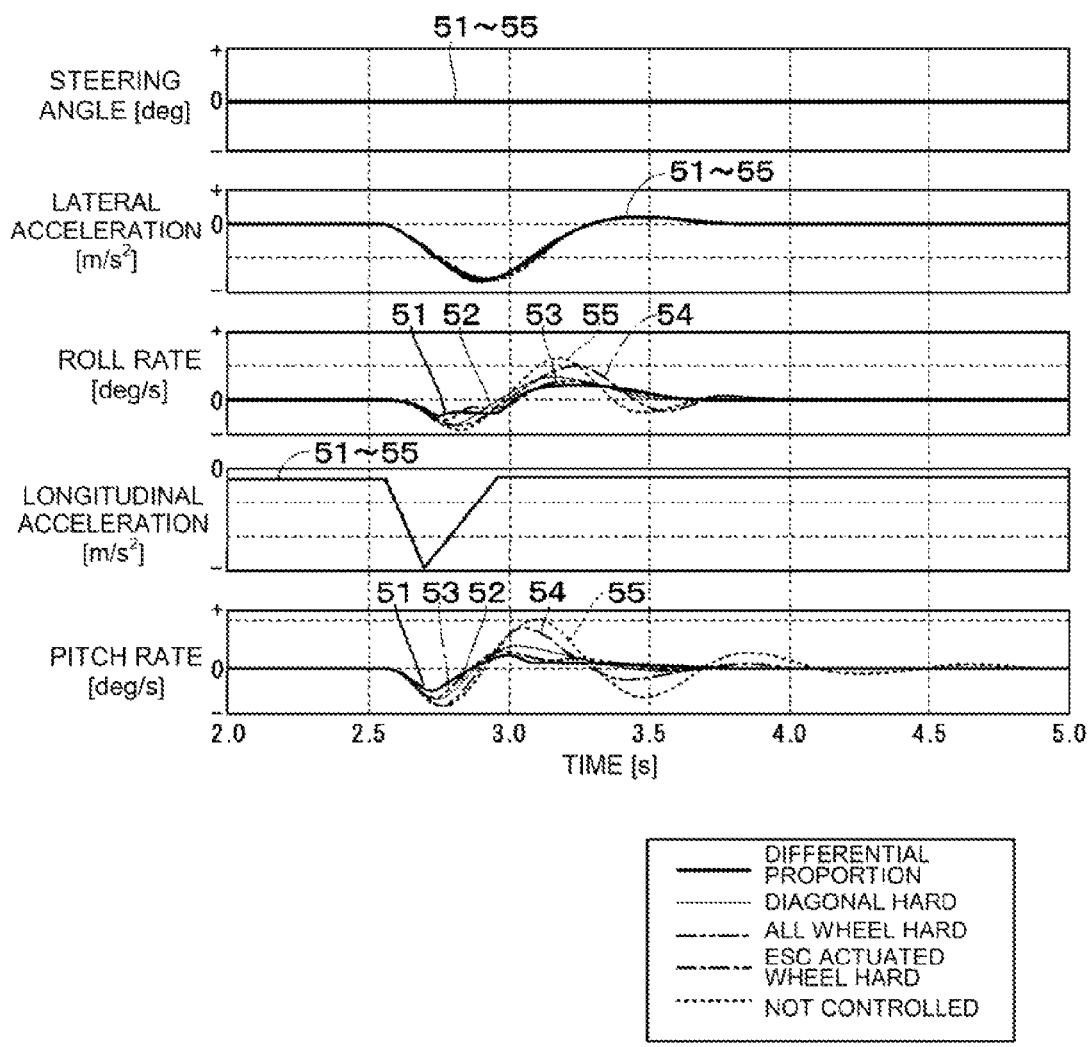
FIG. 7 illustrates characteristic lines that indicate temporal changes in a steering angle, a lateral acceleration, a roll rate, a longitudinal acceleration, and a pitch rate when the braking force is applied to only one wheel while the vehicle runs straight ahead.

Next, FIGS. 5 to 7 illustrate a second embodiment of the present invention. The present embodiment is characterized in that a controller compares a longitudinal force on the left side of the vehicle, which is applied to the left-side front wheel and the left-side rear wheel of the vehicle, with a longitudinal force on the right side of the vehicle, which is applied to the right-side front wheel and the right-side rear wheel of the vehicle. A difference between the longitudinal forces on the left side and the right side is substantially applied to each wheel as a horizontal force. This horizontal force is equal to a difference in the force containing at least the component of the force generation direction of the force generation mechanism, which is generated according to the suspension geometry and applied between the vehicle body and the wheel. According to the present embodiment, the controller adjusts the damping force based on this difference. The present embodiment will be described, identifying similar features to the above-described first embodiment with the same reference numeral, and omitting redundant descriptions thereof.

Referring to FIG. 5, brake hydraulic sensors 31 detect brake hydraulic pressures, for example, in brake apparatus 32 (refer to FIG. 6) such as hydraulic disk brakes or drum brakes mounted on the respective front wheels 2 and rear wheels 3 of the vehicle. In other words, the respective brake hydraulic sensors 31 individually detect the brake hydraulic pressures of the respective wheels 2 and 3 on the front left and right wheels 2 and the rear left and right wheels 3, and output respective detection signals to a controller 33, which will be described below.

The controller 33 controls each of the shock absorbers 6 and 9 (adjusts the damping forces) based on the vehicle motion (the vehicle behavior information) detected by the various kinds of sensors 31 (FIG. 5 only illustrates the brake hydraulic sensors 31) and the like, in a similar manner to the controller 17 according to the above-described first embodiment. According to the second embodiment, the controller 33 corrects a gain (a control gain) for use in the adjustment of the damping force based on a difference between the left side and the right side in terms of the longitudinal forces (the braking forces) applied to the wheels 2 and 3. For achieving this function, the respective brake hydraulic sensors 31 are connected to an input side of the controller 33 directly, or via the CAN or the like. An output side of the controller 33 is connected to the actuator of each of the shock absorbers 6 and 9, and the like. The controller 33 reads in the various kinds of vehicle body behavior information pieces including the brake hydraulic pressures from the various kinds of sensors including the respective brake hydraulic sensors 31.

The controller 33 adjusts the damping force of each of the shock absorbers 6 and 9, more specifically, corrects the control gain for use in the adjustment of the damping force based on the longitudinal force (the braking force) applied to the wheel 2 or 3 due to slow-down or speed-up of the vehicle. In this case, the controller 33 is configured to compare the longitudinal forces applied to the wheels between the left side and the right side of the vehicle, and adjust the damping force (correct the control gain) based on a difference between the longitudinal forces on the left side and right side. For achieving this function, the controller 33 includes torque calculation units 34, a right-side addition unit 35, a left-side addition unit 36, a subtraction unit 37, a longitudinal force calculation unit 38, an acceleration calculation unit 39, a differentiation unit 40 (or a gain correction unit 41), a control gain unit 42, the main control calculation unit 21 illustrated in FIG. 2, and the current driver 28.

The respective torque calculation units 34 calculate torques of the wheels 2 and 3 (torques based on the braking forces) based on the brake hydraulic pressures detected by the brake hydraulic sensors 31. More specifically, the brake hydraulic pressure and the torque (the torque based on the braking force) is proportional to each other. Therefore, the torque calculation units 34 calculate the torques of the respective wheels 2 and 3 from the brake hydraulic pressures based on the proportional relationship between the brake hydraulic pressure and the torque, a map indicating the relationship between the brake hydraulic pressure and the torque, or the like.

The right-side addition unit 35 calculates a total torque on the right side of the vehicle (a sum of the torques of the front right wheel 2 and the rear right wheel 3). More specifically, the right-side addition unit 35 adds the torque calculated by the torque calculation unit 34 of the front right wheel 2 (FR) and the torque calculated by the torque calculation unit 34 of the rear right wheel 3 (PP).

The left-side addition unit 36 calculates a total torque on the left side of the vehicle (a sum of the torques of the front left wheel 3 and the rear left wheel 3). More specifically, the left-side addition unit 36 adds the torque calculated by the torque calculation unit 34 of the front left wheel 2 (FL) and the torque calculated by the torque calculation unit 34 of the rear left wheel 3 (RL).

The subtraction unit 37 calculates the difference between the torques on the left side and the right side. More specifically, the subtraction unit 37 subtracts the torque on the left side of the vehicle, which is calculated by the left-side addition unit 36, front the torque on the right side of the vehicle, which is calculated by the right-side addition unit 35. If the value calculated by the subtraction unit 37 is a positive value (+), this means that the torque is larger on the right side of the vehicle. If the value calculated by the subtraction unit 37 is a negative value (−), this means that the torque is larger on the left side of the vehicle.

The longitudinal force calculation unit 38 calculates a difference between the longitudinal forces (the front-rear forces or the braking forces) on the left side and the right side from the difference between the torques on the left side and the right side, which is calculated by the subtraction unit 37. More specifically, the longitudinal force calculation unit 38 calculates the difference between the longitudinal forces on the left side and the right side by dividing the difference between the torques on the left side and the right side, which is calculated by the subtraction unit 37, by the radius of the wheel (the tire radius).

The acceleration calculation unit 39 calculates a difference between longitudinal accelerations on the left side and the right side from the difference between the longitudinal forces on the left side and the right side, which is calculated by the longitudinal force calculation unit 38. More specifically, the acceleration calculation unit 39 calculates the difference between the longitudinal accelerations on the left side and the right side by dividing the difference between the longitudinal forces on the left side and the right side, which is calculated by the longitudinal force calculation unit 38, by a weight of the vehicle.

The differentiation unit 40 differentiates the difference between the longitudinal accelerations on the left side and the right side, which is calculated by the acceleration calculation unit 39. As a result, a difference between longitudinal jerks (jolts) on the left side and the right side, i.e., a rate of change of the difference between the longitudinal accelerations on the left side and the right side is output from the differentiation unit 40 to the control gain unit 42.

The gain correction unit 41 outputs an instruction for increasing control gains for the front left wheel (FL) and the rear right wheel (RR) to the control gain unit 42 if the difference between the longitudinal accelerations on the left side and the right side, which is calculated by the acceleration calculation unit 39, has a positive value (+). On the other hand, the gain correction unit 41 outputs an instruction for increasing control gains for the front right wheel (FR) and the rear left wheel (RL) to the control gain unit 42 if the difference between the longitudinal accelerations on the left side and the right side, which is calculated by the acceleration calculation unit 39, has a negative value (−). In the case of the controller 33 configured to include the differentiation unit 40, the controller 33 can acquire a control cycle earlier by 90 degrees compared to the controller 33 configured to include the gain correction unit 41, and therefore can perform feed-forward control.

The control gain unit 42 determines a control amount based on (1) the control gain set based on the difference between the longitudinal jerks on the left side and the right side (the rate of change of the difference between the longitudinal accelerations on the left side and the right side), which is output from the differentiation unit 40 and the instruction output from the gain correction unit 41, and (2) the control amount calculated by the main control calculation unit 21. Then, the control gain unit 42 calculates the current instruction value according to the control amount based on the damping force map. The calculated current instruction value is output to the current driver 28.

According to the second embodiment configured in this manner, the controller 33 controls each of the shock absorbers 6 and 9 (adjust the damping force), for example, as illustrated in FIG. 6.

For example, suppose that the electronic stability control system (ESC), which applies a braking force to the predetermined wheel 2 or 3 according to the posture of the vehicle, or the traffic lane departure prevention system, which applies a braking force to the predetermined wheel 2 or 3 according to the relationship between the vehicle and the traffic lane, is actuated while the vehicle is running. When a braking force is applied to, for example, only the front right wheel 2 (and the rear right wheel 3) due to this actuation, the difference between the torques on the left side and the right side, which has a positive value, is output from the subtraction unit 37. Then, the difference between the longitudinal forces on the left side and the right side is output from the longitudinal force calculation unit 38 as a positive value, and the difference between the longitudinal accelerations on the left side and the right side is output from the acceleration calculation unit 39 as a positive value.

The value output from the acceleration calculation unit 39 (the difference between the longitudinal accelerations on the left side and the right side, which is output as a positive value) is differentiated by the differentiation unit 40, is converted by the gain correction unit 41 into the instruction for increasing the control gains for the front left wheel (FL) and the rear right wheel (RR), and is output to the control gain unit 42. The control gain unit 42 determines the control amount based on the output from the differential unit 40 and the output from the gain correction unit 41, and outputs the current instruction value corresponding to the damping force to be generated by each of the shock absorbers 6 and 9 to each of the shock absorbers 6 and 9 via the current driver 28. As a result, the damping forces for the front left wheel (FL) and the rear right wheel (RR) are adjusted (corrected) into the hard direction.

In this manner, the thus-configured second embodiment can also acquire a generally similar effect to the above-described first embodiment.

Especially, according to the second embodiment, the controller 33 is configured to compare the torques applied to the wheels 2 and 3 (the "braking forces" and the "longitudinal forces") between the left side and the right side of the vehicle, and adjust the damping force and correct the control gain based on the difference between the torques on the left side and the right side (a "difference between the braking forces on the left side and the right side", the "difference between the longitudinal forces on the left side and the right side", the "difference between the longitudinal accelerations on the left side and the right side", and the "rate of change of the difference between the longitudinal accelerations on the left side and the right side"). Therefore, for example, when the torques applied to the wheels 2 and 3 are different between the left side and the right side of the vehicle due to actuation of the electronic stability control system (ESC), actuation of the traffic lane departure prevention system, or the like, the controller 33 can adjust the damping force (correct the control gain) according to this difference.

In other words, when the longitudinal force (the braking force) is applied to the wheel 2 and 3 due to slow-down or speed-up of the vehicle, the vertical force (the suspension reaction force) is applied to the vehicle body 1 according to the relationship between this longitudinal force and the suspension geometry of the vehicle. Then, the controller 33 adjusts the damping force based on the difference between the left side and right side in terms of the torques applied to the wheels 2 and 3, and thus the difference between the left side and the right side in terms of the longitudinal forces applied to the wheels 2 and 3, thereby succeeding in adjusting the damping force in consideration of the vertical force applied to the vehicle based on the relationship between the longitudinal force and the suspension geometry.

For example, when a braking force (a force for stopping the wheel) is applied to only the front right wheel 2 (when a longitudinal force is applied to only the front right wheel 2 due to braking) while the vehicle is running, the front side of the vehicle body is supposed to be lowered due to an inertial force based on slow-down. However, an upward suspension reaction force (an anti-dive force) is generated on the front right wheel 2 according to the suspension geometry (the anti-dive geometry) of the vehicle based on the braking force. As a result, while the front right wheel 2 has a small behavior, other wheels than the front right wheel 2 (for example, the front left wheel 2 and the rear right wheel 3) have a large behavior.

For handling this case, according to the second embodiment, as illustrated in FIG. 6, when a braking force (a longitudinal force) is applied to only the front right wheel 2 due to actuation of the electronic stability control system (ESC) while the vehicle is running, the shock absorbers 6 and 9 on other wheels than the front right wheel 2 are adjusted (corrected) into the hard direction based on the outputs from the differentiation unit 40 and the gain correction unit 41 (for example, the gains for the front left wheel 2 and the rear right wheel 3 increase so that the control amounts therefor increase). Conversely, when a braking force (a longitudinal force) is applied to only the front left wheel 2, the shock absorbers 6 and 9 on other wheels than the front left wheel 2 are adjusted (corrected) into the hard direction based on the outputs from the differentiation unit 40 and the gain correction unit 41 (for example, the gains for the front right wheel 2 and the rear left wheel 3 increase so that the control amounts therefor increase). As a result, the second embodiment can constrain, prevent or reduce excessiveness or insufficiency of the damping force, thereby improving the maneuverability and the stability, when the electronic stability control system is actuated.

For example, when braking forces are applied to the front right wheel 2 and the rear right wheel 3 (when longitudinal forces are applied to the front right wheel 2 and the rear right wheel 3 due to braking) due to actuation of the electronic stability control system, the shock absorber 6 on another wheel than the front right wheel 2 and the rear right wheel 3 (for example, the front left wheel 2) can be also adjusted (corrected) into the hard direction (the gain therefor can increase) based on the outputs from the differentiation unit 40 and the gain correction unit 41. Conversely, when braking forces are applied to the front left wheel 2 and the rear left wheel 3 (when longitudinal forces are applied to the front left wheel 2 and the rear left wheel 3 due to braking), the shock absorbers 6 on another wheel than the front left wheel 2 and the rear left wheel 3 (for example, the front right wheel 2) can be also adjusted (corrected) into the hard direction (the gain therefor can increase) based on the outputs from the differentiation unit 40 and the gain correction unit 41. As a result, when a braking force is applied to only one of the front wheels 2 on the left side and the right side (and the rear wheel 3) based on actuation of the electronic stability control system, the second embodiment can adjust the damping force according to the actual behavior of the vehicle at that time, thereby improving the maneuverability and the stability.

Further, for example, suppose that the vehicle is configured to include electric motors (in-wheel motors) mounted on the wheels 2 and 3, i.e., the vehicle is configured to provide a braking force by regeneration of the in-wheel motor. When this vehicle approaches a traffic lane line on the right side (the vehicle runs off the traffic lane on the right side), and a braking force is applied to the front left wheel 2 based on a braking instruction (a torque instruction) of the traffic lane departure prevention system while the vehicle is running, the shock absorber 6 on another wheel than the front left wheel 2 (for example, the front right wheel 2) can be also corrected into the hard direction (the gain therefor can increase). Conversely, when this vehicle approaches a traffic lane line on the left side (the vehicle runs off the traffic lane on the left side), and a braking force is applied to the front right wheel 2 based on a braking instruction (a torque instruction) of the traffic lane departure prevention system, the shock absorber 6 on another wheel than the front right wheel 2 (for example, the front left wheel 2) can be also corrected into the hard direction (the gain therefor can increase). In this case, the detection and calculation of the braking force, the torque, and the longitudinal force, the calculation of the difference therein between the left side and the right side, and the like can be performed based on the braking instruction instead of the hydraulic pressures detected by the brake hydraulic sensors.

In any case, the second embodiment can adjust (correct) the damping force based on the longitudinal force applied to the wheel 2 or 3 (and the relationship between this longitudinal force and the suspension geometry) according to the behavior of the wheel 2 or 3. As a result, the second embodiment can constrain, prevent or reduce excessiveness or insufficiency of the damping force of each of the shock absorbers 6 and 9, thereby improving the maneuverability and the stability.

According to the second embodiment, the controller 33 is configured to, when a torque (a longitudinal force) is large on one of the front wheels 2 on the left side and the right side among the total four wheels 2 and 3 arranged in the front-rear direction and the left-right direction, adjust the damping forces of the shock absorbers 6 and 9 on the other of the front wheels 2, which is an adjacent wheel to the one of the front wheels 2 in the left-right direction, and one of the wheels 3 that is a wheel behind the one of the front wheels 2 in the front-rear direction, into the hard direction. As a result, when a large longitudinal force is applied to the one of the front wheels 2, the second embodiment can adjust the damping force in consistency with the actual behavior of the vehicle (the behavior according to the suspension geometry) at that time. Therefore, the second embodiment can improve the maneuverability and the stability.

Next, a simulation result of the configuration according to the second embodiment will be described with reference to FIG. 7.

Referring to FIG. 7, a characteristic line 51 (a solid line) represents the configuration including the differentiation unit 40 according the second embodiment (differentiation proportion). A characteristic line 52 (a thin line) represents the configuration including the gain correction unit 41 according to the second embodiment (diagonal hard). A characteristic line 53 (an alternate long and two short dashes line) represents a first comparative example (all wheels hard). A characteristic line 54 (an alternate long and short dash line) represents a second comparative example (ESC actuated wheel hard). A characteristic line 55 (a broken line) represents a third comparative example (not controlled).

The first comparative example (the characteristic line 53) is configured to change the damping forces of the shock absorbers on all of the four wheels into the hard direction, when the electronic stability control system (ESC) is actuated (a difference between the torques on the left side and the right side is detected). The second comparative example (the characteristic line 54) is configured to change the damping force of the shock absorber on a wheel (a braked wheel) subject to a braking force into the hard direction, when the electronic stability control system is actuated. The third comparative example (the characteristic line 55) is configured not to change the damping forces of the shock absorbers, even when the antiskid brake system is actuated.

As apparent from the simulation result illustrated in FIG. 7, the differential proportion configuration (the characteristic line 51) and the diagonal hard configuration (the characteristic line 52), which are the configurations according to the second embodiment, can more effectively constrain, prevent or reduce the behavior of the vehicle (the roll rate and the pitch rate) than the ESC actuated wheel hard configuration (the characteristic line 54), which is the second comparative example. Further, the differential proportion configuration (the characteristic line 51) and the diagonal hard configuration (the characteristic line 52), which are the configurations according to the second embodiment, can acquire a similar behavior prevention or reduction performance to the all wheel hard configuration (the characteristic line 53), which is the first comparative example.

More specifically, the ESC actuated wheel hard configuration (the characteristic line 54), which is the second comparative example, aims at stabilizing the behavior of the vehicle and improving the maneuverability by changing the damping force of the shock absorber on a wheel subject to a braking force (a braked wheel) into the hard direction. On the other hand, the differential proportion configuration (the characteristic line 51) and the diagonal hard configuration (the characteristic line 52), which are the configurations according to the second embodiment, focus on the fact that other wheels 2 and 3 than the ESC actuated wheel (the braked wheel) have large behaviors in consideration of the tire reaction force (the suspension reaction force based on the longitudinal force applied to the wheel 2 or 3), and appropriately increase the damping forces of the shock absorbers 6 and 9 on these wheels 2 and 3 having the large behaviors, thereby succeeding in constraining, preventing or reducing the behavior of the vehicle.

On the other hand, the all wheel hard configuration (the characteristic line 53), which is the first comparative example, aims at stabilizing the behavior of the vehicle and improving the maneuverability by changing the damping forces of the shock absorbers on all of the four wheels into the hard direction. However, in actual use, all of the four wheels do not have a same behavior, whereby the first comparative example ends up changing even the damping force of the shock absorber on the wheel 2 or 3 having a small behavior due to the suspension reaction force into the hard direction. Therefore, the first comparative example may deteriorate ride comfort when the vehicle is running on a rough road surface in addition to increasing energy consumption due to the change of the damping force into the hard direction, compared to the differential proportion configuration (the characteristic line 51) and the diagonal hard configuration (the characteristic line 52), which are the configurations according to the second embodiment.

On the other hand, the configurations according to the second embodiment adjust only the damping force of the shock absorber 6 or 9 required to stabilize the behavior of the vehicle and improve the maneuverability when the electronic stability control system is actuated, thereby succeeding in realizing both stabilization of the behavior of the vehicle and improvement of the maneuverability, and a reduction in energy consumption (improvement of the efficiency).

A third embodiment will be described. The above-described embodiments have been described based on the example in which the present invention is employed for a semi-active suspension that switches the damping force. The third embodiment will be described based on an example in which the present invention is employed for an electromagnetic damper (an active suspension) that can freely generate a thrust force.

Figure 8:
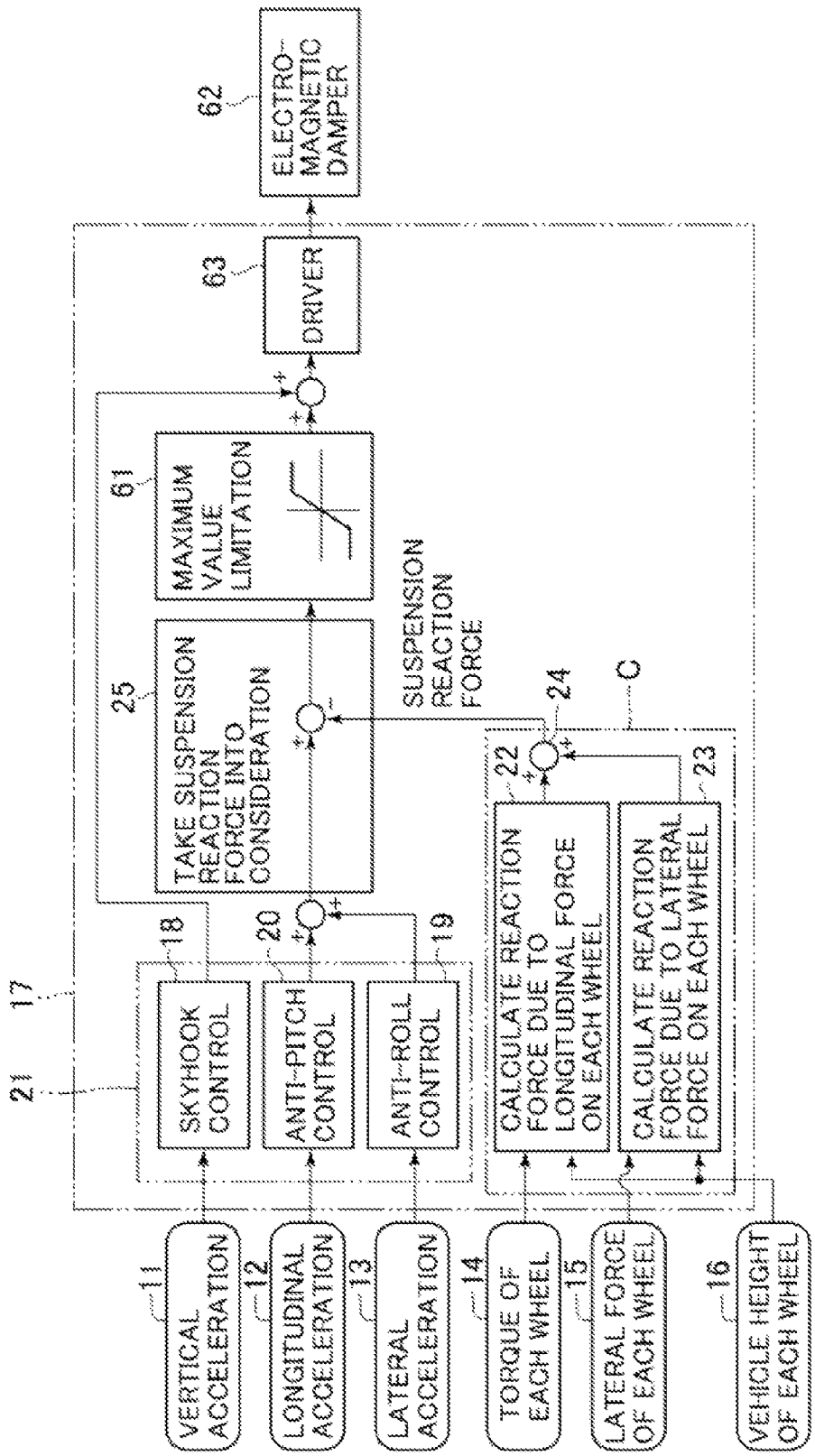
FIG. 8 is a block diagram illustrating a controller of a suspension system according to a third embodiment.

FIG. 8 illustrates the third embodiment of the present invention. The present embodiment will be described, identifying similar features to the above-described first embodiment with the same reference numeral, and omitting redundant descriptions thereof. The third embodiment also calculates the suspension reaction force Fs of each wheel, and the control instructions of the Skyhook control unit 18, the anti-pitch control unit 20, and the anti-roll control unit 19, in a similar manner to the first embodiment.

The suspension reaction force Fs is generated due to speed-up, slow-down, or cornering, and works in a direction for reducing a behavior in most cases. Therefore, the third embodiment subtracts the suspension reaction force Fs from the control instruction calculated by adding the control instructions from the anti-pitch control and the roll control for reducing a behavior at this time. Then, the third embodiment imposes a maximum value limitation for maneuverability and stability control on this value determined in consideration of the suspension reaction force Fs by a maximum value limitation unit 61, thereby succeeding in maximizing the force within a range of the thrust force that an electromagnetic damper 62 (the force generation mechanism) can generate. The maximum value limitation for the maneuverability and stability control, which is imposed by the maximum value limitation unit 61, is set so as to be smaller to some degree than a value that the electromagnetic damper 62 can generate so that a state capable of performing the ride comfort (Skyhook) control is constantly maintained even when a large thrust force is generated due to the anti-roll and anti-pitch control, thereby allowing even a bad road while the vehicle is turning a corner to be addressed. Then, the Skyhook control instruction is added, and the resultant value is output to a driver 63 as the corrected target thrust force to control the electromagnetic damper 62.

In this manner, when there is some constraint on the maximum thrust force, imposing the maximum value limitation on the value determined in consideration of the reaction force can realize full utilization of the thrust force. This is because correcting the value with the maximum value limitation imposed thereon with use of the reaction force may result in a failure in fully exerting the maximum force, which might be corrected to a smaller value even through a still larger value is acceptable.

According to the above-describe embodiments, it is possible to improve the maneuverability and the stability of the vehicle.

According to the embodiments of the present invention, the controller is configured to adjust the force to be generated by the force generation mechanism (calculate and control the force to be generated) based on the horizontal force applied to the wheel due to slow-down, speed-up, or cornering of the vehicle, i.e., the longitudinal force and the lateral force (the braking force, the driving force, and the left-right force). In this case, the controller is configured to calculate the force to be generated in consideration of the force (the geometry force) containing the component of the force generation direction of the force generation mechanism, which is generated due to the horizontal force applied to the wheel according to the suspension geometry.

More specifically, the controller can calculate the geometry force from the longitudinal force and the lateral force applied to the wheel, and use this calculated geometry force as the correction value in the adjustment of the force to be generated by the force generation mechanism. Alternatively, for example, the controller can compare the horizontal forces applied to the wheels between the left side and the right side of the vehicle, and correct the gain (the control gain) for use in the adjustment of the damping force based on this difference between the left side and the right side. In either case, the embodiments of the present invention can constrain, prevent or reduce excessiveness or insufficiency of the damping forces, thereby improving the maneuverability and the stability.

According to some of the embodiments of the present invention, the controller includes the geometry force calculation unit configured to calculate the force containing at least the component of the force generation direction of the force generation mechanism, which is generated according to the suspension geometry and applied between the vehicle body and the wheel due to the horizontal force applied to each wheel, and is configured to calculate the force to be generated with use of the calculation result of the geometry force calculation unit. Therefore, the controller can calculate the appropriate force to be generated by the force generation mechanism in consistency with the force actually applied between the vehicle body and the wheel according to the suspension geometry, based on the calculation result of the geometry force calculation unit. As a result, these embodiments of the present invention can constrain, prevent or reduce excessiveness or insufficiency of the damping force, thereby improving the maneuverability and the stability.

According to some of the embodiments of the present invention, the horizontal force is the longitudinal force applied to the wheel due to slow-down or speed-up of each wheel, and/or the lateral force applied to the wheel due to cornering of the vehicle. As a result, these embodiments of the present invention can constrain, prevent or reduce excessiveness or insufficiency of the force to be generated by the force generation mechanism according to the longitudinal force and/or the lateral force applied to the wheel.

According to some of the embodiments of the present invention, the geometry force calculation unit is configured to calculate the force with use of the detected or estimated vehicle height of each wheel. As a result, the controller can calculate the force to be calculated by the geometry force calculation unit as a more appropriate value according to the vehicle height at that time. Therefore, these embodiments can more high-dimensionally constrain, prevent or reduce excessiveness or insufficiency of the force to be generated by the force generation mechanism.

According to some of the embodiments of the present invention, the calculation of the force to be generated by the force generation mechanism based on the vehicle body behavior information is a calculation based on the vehicle vibration control, the anti-pitch control, and/or the anti-roll control, and the controller is configured to correct a calculation result therefrom with use of the calculation result of the geometry force calculation unit. As a result, the calculation result based on the vehicle vibration control, the anti-pitch control, and/or the anti-roll control is corrected with use of the calculation result of the geometry force calculation unit. Therefore, these embodiments can more high-dimensionally constrain, prevent or reduce excessiveness or insufficiency of the force to be generated by the force generation mechanism.

According to some of the embodiments of the present invention, the controller is configured to take into consideration the force containing at least the component of the force generation direction of the force generation mechanism, which is generated according to the suspension geometry and applied between the vehicle body and the wheel due to the horizontal force applied to each wheel, by correcting the force to be generated based on the difference in the horizontal force applied to the wheel between the left side and the right side. As a result, when the longitudinal force applied to the wheel is difference between the left side and the right side of the vehicle due to, for example, actuation of the electronic stability control system (ESC) or actuation of the traffic lane departure prevention system, the controller can adjust the force to be generated according to this difference.

More specifically, when the horizontal force (the longitudinal force and/or the lateral force) is applied to the wheel, due to slow-down, speed-up, or cornering of the vehicle, the force (the suspension reaction force) according to this horizontal force and the suspension geometry of the vehicle is applied to the vehicle body. Therefore, the controller adjusts the force to be generated, for example, corrects the control gain based on the difference in the horizontal force between the left side and the right side, and thereby can adjust the force to be generated in consideration of the force applied to the vehicle based on the relationship between this horizontal force and the suspension geometry.

According to some of the embodiments of the present invention, the controller is configured to take into consideration the force containing at least the component of the force generation direction of the force generation mechanism, which is generated according to the suspension geometry and applied between the vehicle body and the wheel due to the horizontal force applied to each wheel, by correcting the force to be generated based on the difference in the horizontal force applied to the wheel between the front side and the rear side. Also in this case, the controller can also adjust the force to be generated in consideration of the force applied to the vehicle based on the relationship between the horizontal force and the suspension geometry, in a similar manner to the embodiments that correct the force to be generated based on the difference between the left side and the right side.

According to some of the embodiments of the present invention, the controller is configured to take into consideration the force containing at least the component of the force generation direction of the force generation mechanism, which is generated according to the suspension geometry and applied between the vehicle body and the wheel due to the horizontal force applied to each wheel, by correcting the force to be generated in such a manner that, when one of the front wheels arranged in the left-right direction among the total four wheels arranged in the front-rear direction and the left-right direction is subject to a large force, the force to be generated increases on the other of the front wheels arranged in the left-right direction, and one of the rear wheels on a same side in the left-right direction as the one of the front wheels arranged in the left-right direction. Therefore, the controller can adjust the force to be generated in consistency with the actual behavior of the vehicle at that time (the behavior according to the suspension geometry) when the longitudinal force increases on the one of the front wheels. As a result, these embodiments can improve the maneuverability and the stability.

According to some of the embodiments of the present invention, the horizontal force (the longitudinal force) applied to the wheel due to slow-down of the vehicle is a force based on actuation of the electronic stability control system that provides a braking force to a predetermined wheel according to the posture of the vehicle. In this case, the controller can adjust the force to be generated according to the actual behavior of the vehicle at that time, when a braking force is applied to one of the front wheels in the left-right direction (and the rear wheel) based on actuation of the electronic stability control system. As a result, these embodiments can improve the maneuverability and the stability.

Any features of the embodiments can be combined.

According to the suspension apparatus of the present invention, it is possible to improve the maneuverability and the stability.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

What is claimed is:

1. A suspension system comprising:
a force generation mechanism disposed between a vehicle body side and a wheel side of a vehicle, and capable of generating a force in upward and downward directions and adjusting the force to be generated; and
a controller configured to calculate and control the force to be generated by the force generation mechanism based on vehicle body behavior information,
wherein the controller includes a geometry force calculation unit configured to calculate a force which contains the component of a force in upward and downward directions and which is applied between the vehicle body and the wheel and is generated according to the suspension geometry of the suspension system due to a horizontal force applied to each wheel, and
wherein the controller determines the force to be generated by the force to be generated by the force generation mechanism that is calculated based on the vehicle body behavior information being amended by the geometry force calculation unit.

2. The suspension system according to claim 1, wherein the horizontal force is a longitudinal force applied to the wheel due to slow-down or speed-up of the each wheel, and/or a lateral force applied to the wheel due to cornering of the vehicle.

3. The suspension system according to claim 1, wherein the geometry force calculation unit calculates the force with use of a detected or estimated vehicle height of the each wheel.

4. The suspension system according to claim 2, wherein the geometry force calculation unit calculates the force with use of a detected or estimated vehicle height of the each wheel.

5. The suspension system according to claim 1, wherein the calculation of the force to be generated by the force generation mechanism based on the vehicle body behavior information is a calculation based on vehicle vibration control, anti-pitch control, and/or anti-roll control, and the controller corrects a calculation result therefrom with use of the calculation result of the geometry force calculation unit.

6. The suspension system according to claim 2, wherein the calculation of the force to be generated by the force generation mechanism based on the vehicle body behavior information is a calculation based on vehicle vibration control, anti-pitch control, and/or anti-roll control, and the controller corrects a calculation result therefrom with use of the calculation result of the geometry force calculation unit.

7. The suspension system according to claim 3, wherein the calculation of the force to be generated by the force generation mechanism based on the vehicle body behavior information is a calculation based on vehicle vibration control, anti-pitch control, and/or anti-roll control, and the controller corrects a calculation result therefrom with use of the calculation result of the geometry force calculation unit.

8. The suspension system according to claim 1, wherein the controller takes into consideration the force containing at least the component of the force generation direction of the force generation mechanism, which is generated according to the suspension geometry and applied between the vehicle body and the wheel due to the horizontal force applied to the each wheel, by correcting the force to be generated based on a difference in the horizontal force applied to the wheel between a left side and a right side.

9. The suspension system according to claim 1, wherein the controller takes into consideration the force containing at least the component of the force generation direction of the force generation mechanism, which is generated according to the suspension geometry and applied between the vehicle body and the wheel due to the horizontal force applied to the each wheel, by correcting the force to be generated based on a difference in the horizontal force applied to the wheel between a front side and a rear side.

10. The suspension system according to claim 1, wherein the controller takes into consideration the force containing at least the component of the force generation direction of the force generation mechanism, which is generated according to the suspension geometry and applied between the vehicle body and the wheel due to the horizontal force applied to the each wheel, by correcting the force to be generated in such a manner that, when one of front wheels arranged in a left-right direction among total four wheels arranged in a front-rear direction and the left-right direction is subject to a large force, the force to be generated increases on the other of the front wheels arranged in the left-right direction, and one of the rear wheels on a same side in the left-right direction as the one of the front wheels arranged in the left-right direction.

* * * * *